No. 645,343. Patented Mar. 13, 1900.
C. WELLER & G. F. LACHENMYER.
PROTECTOR AGAINST INSECTS FOR HORSES.
(Application filed July 27, 1899.)
(No Model.)
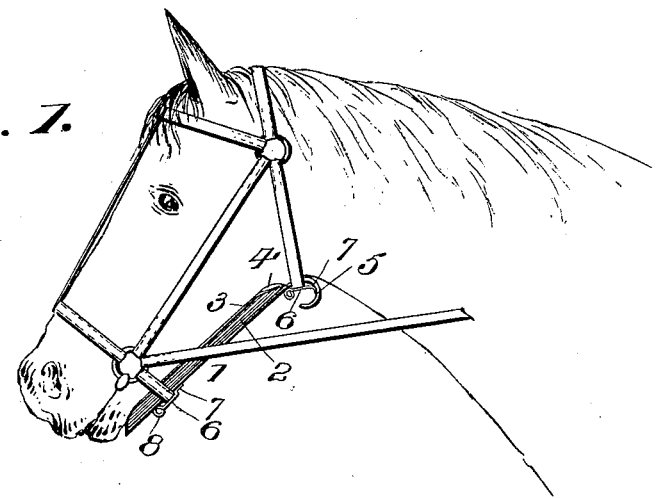
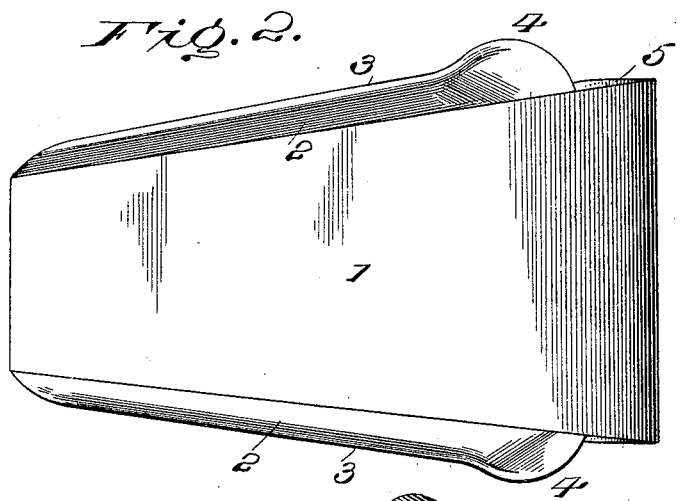
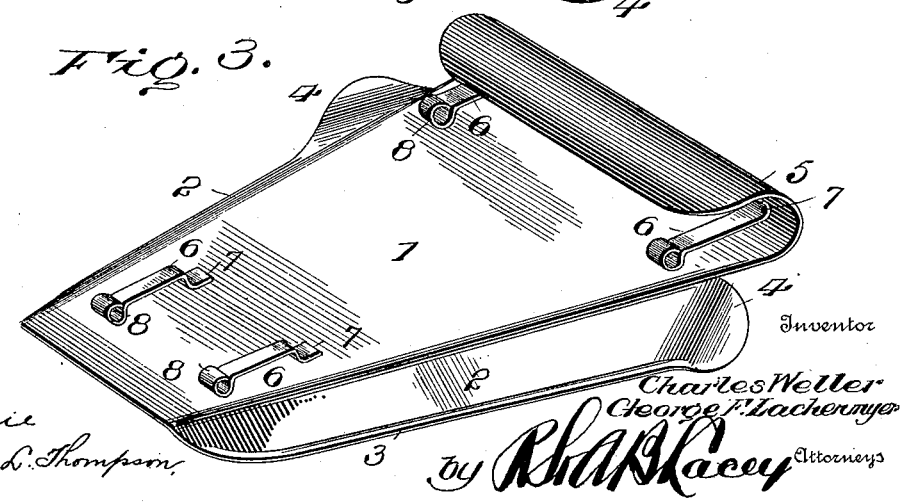

UNITED STATES PATENT OFFICE.

CHARLES WELLER AND GEORGE F. LACHENMYER, OF MOUNT PULASKI, ILLINOIS.

PROTECTOR AGAINST INSECTS FOR HORSES.

SPECIFICATION forming part of Letters Patent No. 645,343, dated March 13, 1900.

Application filed July 27, 1899. Serial No. 725,308. (No model.)

*To all whom it may concern:*

Be it known that we, CHARLES WELLER and GEORGE F. LACHENMYER, citizens of the United States, residing at Mount Pulaski, in the county of Logan and State of Illinois, have invented certain new and useful Improvements in Protectors for Horses Against Flies; and we do hereby declare the following to be a full, clear, and exact description of the invention, such as will enable others skilled in the art to which it appertains to make and use the same.

This invention relates to means for protecting animals, chiefly horses, against the attacks of bott-flies, the device being especially adapted for application to the jaws, which is the principal point of attack and most susceptible to the sting.

The object of the invention is the provision of a device for the purpose aforesaid which will cause little or no inconvenience to the animal when properly adjusted and fitted to place and which will be effective, light, cheap, and withal not unsightly, and easy of application to any make of head-gear.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1 is a side elevation of a horse's head, showing the protector in position. Fig. 2 is a top plan view of the device detached. Fig. 3 is a perspective view of the protector inverted.

Corresponding and like parts are referred to in the following description and indicated in all the views of the drawings by the same reference characters.

The protector 1 is constructed of any suitable stout and light material which will retain the shape given thereto when pressed into the required form. Sheet metal, stout leather, papier-mâché, or any like composition are designed as the best materials, since they fulfill the necessary conditions. The device is of oblong and tapering form, corresponding approximately to the outline of the jaws of the animal or horse. The protector is formed from a single blank of selected sheet material, the same being tapering in length and having its longitudinal edge portions bent upwardly, as shown at 2, the corners being rounding and outwardly deflected, as shown at 3, thereby obviating injurious contact with the throat or mouth of the animal. In the event of sheet metal being the material selected the upper edge of the bent portions 2 is outwardly deflected, as shown at 4, to provide an extended bearing-surface and obviate injury to the cheeks or jaws of the animal. The upper or wider end of the protector is formed into a roll 5, which comes in contact with the throat and prevents injury or chafing thereof. The longitudinally-bent edge portions 2 terminate a short distance from the roll 5, thereby admitting of the end portion of the blank being bent into the shape substantially as shown.

The bent edge portions 2 prevent lateral displacement of the protector when fitted to the jaws of the animal and also serve to exclude flies and like insects from entering laterally into the space formed between the body portion of the protector and the jaws of the animal. These parts 2 also serve as strengthing-flanges to prevent sagging of the protector intermediate of its ends. The protector is fitted to the jaws of the animal and extends from the mouth to the throat and is attached at its ends to the head-gear or bridle in any convenient manner. As shown, loops 6 are applied to opposite ends of the protector to receive the nose-band and throat-latch of the bridle about as indicated in Fig. 1. These loops 6 are constructed of spring metal and consist of short lengths of metallic strips bent intermediate of their ends, one end being rigidly attached to the protector, as indicated at 7, and the opposite end being disconnected from said protector and formed into a roll 8, which is designed to be grasped when it is required to move the free end of the loop away from the body of the protector to admit of the insertion of the strap into the loop when placing the device in position or removing it from the jaws of the animal when not required for immediate service. It will thus be seen that the protector can be readily applied to or removed from the head of the animal without necessitating the loosening of any of the straps or parts of the bridle or head-gear.

It is highly important that the device be rigid to enable the effective use of the loose-ended fastenings 6 for retaining the throat-latch and chin-strap in position against casual displacement. The side flanges 2 serve to stiffen the body longitudinally, besides forming guards to prevent access of insects to the lower jaw of the animal. The roll 5 stiffens the device transversely, prevents chafing of the animal's neck, and houses the rear fastenings 6.

When the animal is bridled and it is required to place the protector in position, the smaller end thereof is thrust between the jaw of the animal and the chin-strap and the loose ends of the lower fastenings 6 moved away from the body to admit of the chin-strap passing thereunder. The upper end of the protector is now passed between the throat-latch and the jaw of the animal, and the loose ends of the upper fastenings are forced from the body to admit of the throat-latch entering the looped portions of the said fastenings.

The protector in its entirety is light, cheap, durable, effective for the purpose designed, capable of being quickly placed in position or removed without requiring the loosening of any single strap of the bridle, does not irritate the animal when worn, and is cooling.

Having thus described the invention, what is claimed as new is—

As an improved article of manufacture, an insect-protector to be applied to the lower jaw of an animal and adapted to be removably attached to the bridle without requiring the loosening of a single strap, the same consisting of a rigid body having side flanges forming guards and stiffeners, a rear roll constituting a transverse stiffener and housing, and a pair of loop-shaped spring-fastenings at the front and at the rear of the said body and secured at their rear ends thereto and having their front ends loose and held against the body by spring action, and having the rear set of fastenings housed by the roll, substantially as described.

In testimony whereof we affix our signatures in presence of two witnesses.

CHARLES WELLER. [L. S.]
GEORGE F. LACHENMYER. [L. S.]

Witnesses:
HENRY BANMANN,
R. S. HERSHEY.